US009444537B1

(12) United States Patent
Choi et al.

(10) Patent No.: US 9,444,537 B1
(45) Date of Patent: *Sep. 13, 2016

(54) DEVICES FOR COEXISTENCE OF TRANSMITTERS AND RECEIVERS OPERATING BASED ON DIFFERENT WIRELESS PROTOCOLS

(71) Applicant: Marvell International Ltd., Hamilton (BM)

(72) Inventors: Jihwan P. Choi, Daegu (KR); Hui-Ling Lou, Sunnyvale, CA (US); Ying Cai, Campbell, CA (US); Leilei Song, Sunnyvale, CA (US); Vladan Petrovic, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 15/000,175

(22) Filed: Jan. 19, 2016

Related U.S. Application Data (63) Continuation of application No. 14/691,131, filed on Apr. 20, 2015, now Pat. No. 9,247,507, which is a continuation of application No. 13/553,146, filed on Jul. 19, 2012, now Pat. No. 9,014,751.

(60) Provisional application No. 61/522,149, filed on Aug. 10, 2011.

(51) Int. Cl.
*H04W 72/04* (2009.01)
*H04B 7/04* (2006.01)
*H04W 52/34* (2009.01)

(52) U.S. Cl.
CPC ......... *H04B 7/0486* (2013.01); *H04W 52/346* (2013.01); *H04W 72/0453* (2013.01)

(58) Field of Classification Search
CPC .................. H04W 72/0453; H04W 52/38
USPC ............ 455/63.3, 67.11, 452.2, 454, 522, 69
See application file for complete search history.

(56) References Cited

U.S. PATENT DOCUMENTS

| 7,400,903 B2 * | 7/2008 | Shoemake ............ H04W 72/02 455/450 |
| 9,014,751 B1 | 4/2015 | Choi et al. |
| 2007/0047625 A1 | 3/2007 | Klomsdorf et al. |
| 2012/0213116 A1 * | 8/2012 | Koo ..................... H04B 1/1027 370/253 |

OTHER PUBLICATIONS

IEEE Std 802.15.2; IEEE Recommended Practice for Information technology—Telecommunications and information exchange between systems—Local and metropolitan area networks—Specific requirements; Part 15.2: Coexistence of Wireless Personal Area Networks with Other Wireless Devices Operating in Unlicensed Frequency Bands; Aug. 28, 2003; p. 1-126.

* cited by examiner

*Primary Examiner* — John J Lee (57) ABSTRACT

A device including a transmitter, a receiver and an arbiter. The transmitter transmits a first signal. The first signal has a fundamental frequency in a first frequency band of a first wireless protocol. The receiver receives a second signal. The second signal has a fundamental frequency in a second frequency band of a second wireless protocol. The first frequency band is adjacent to or at least partially overlaps the second frequency band. The arbiter allows the transmitter to transmit the first signal in the first frequency band while the receiver receives the second signal in the second frequency band. The arbiter also, if a power level of the first signal is less than a first threshold, changes: a modulation and coding scheme of the transmitter for the first signal; a modulation and coding scheme of the receiver for the second signal; or a multiple input and multiple output rank.

20 Claims, 7 Drawing Sheets

DEVICES FOR COEXISTENCE OF TRANSMITTERS AND RECEIVERS OPERATING BASED ON DIFFERENT WIRELESS PROTOCOLS

CROSS-REFERENCE TO RELATED APPLICATIONS

This application is a continuation of U.S. Non-Provisional patent application Ser. No. 14/691,131, filed on Apr. 20, 2015, which is a continuation of U.S. Non-Provisional patent application Ser. No. 13/553,146, filed on Jul. 19, 2012 (now U.S. Pat. No. 9,014,751) which claims the benefit of U.S. Provisional Patent Application Ser. No. 61/522,149, filed on Aug. 10, 2011, entitled "Use of Signal Power Levels for In-device Co-existence Scheduling," the disclosures thereof incorporated by reference herein in their entirety.

FIELD

The present disclosure relates generally to the field of wireless communication. More particularly, the present disclosure relates to avoiding interference between different wireless communication technologies that use adjacent or overlapping frequency bands.

BACKGROUND

The popularity of multiple wireless communication technologies for handheld platforms has created a need to integrate wireless communication technologies on a single wireless communication device. However, the frequency bands of some of these technologies are close enough to result in interference. For example, the un-licensed 2.4 GHz Industrial, Scientific and Medical (ISM) frequency band is adjacent to some of the bands used by Mobile Wireless Standards (MWS) technologies to result in adjacent channel interference. In many electronic devices such as smartphones, both ISM and MWS technologies are implemented in the same device. For example, a smartphone may employ LTE (Long Term Evolution) for phone calls, WiFi for local area networking, and Bluetooth for headsets. LTE transmissions from the smartphone will cause adjacent channel interference with incoming Bluetooth and WiFi signals. Similarly, Bluetooth and WiFi transmissions from the smartphone will cause adjacent channel interference with incoming LTE signals. This adjacent channel interference can significantly degrade performance not only at the smartphone, but also at connected MWS base stations.

SUMMARY

In general, in one aspect, an embodiment features an apparatus comprising: a transmitter configured to transmit, according to a first protocol, first wireless signals in a first frequency band; and a receiver configured to receive, according to a second protocol, second wireless signals in a second frequency band, wherein the second frequency band is adjacent to or overlaps the first frequency band; and an arbiter configured to allow the transmitter to transmit the first wireless signals according to the first protocol while the receiver receives the second wireless signals according to the second protocol responsive to at least one of i) a signal power level of the first wireless signals being less than a first signal power threshold; and ii) a signal power level of the second wireless signals being greater than a second signal power threshold.

Embodiments of the apparatus can include one or more of the following features. In some embodiments, the first protocol is a Mobile Wireless Standards (MWS) protocol; and the second protocol is an Industrial, Scientific and Medical (ISM) band protocol. In some embodiments, the first protocol is an Industrial, Scientific and Medical (ISM) band protocol; and the second protocol is a Mobile Wireless Standards (MWS) protocol. In some embodiments, each of the first protocol and the second protocol, is an Industrial, Scientific and Medical (ISM) band protocol. In some embodiments, the arbiter is further configured to change a receive mode for the receiver responsive to at least one of i) the signal power level of the first wireless signals not being less than the first signal power threshold, and ii) the signal power level of the second wireless signals not being greater than the second signal power threshold. In some embodiments, the arbiter is further configured to change at least one of a transmit mode and a signal power level for the transmitter based on at least one of i) the signal power level of the first wireless signals not being less than the first signal power threshold, and i) the signal power level of the second wireless signals not being greater than the second signal power threshold. In some embodiments, the arbiter is further configured not to allow the transmitter to transmit the first wireless signals according to the first protocol while the receiver receives the second wireless signals according to the second protocol responsive to i) a priority of the first wireless signals being less than a priority of the second wireless signals, and ii) at least one of a) the signal power level of the first wireless signals not being less than the first signal power threshold, and b) the signal power level of the second wireless signals not being greater than the second signal power threshold. Some embodiments comprise an electronic device comprising the apparatus of.

In general, in one aspect, an embodiment features a method comprising: transmitting, according to a first protocol, first wireless signals in a first frequency band while receiving, according to a second protocol, second wireless signals in a second frequency band that is adjacent to or overlaps the first frequency band, responsive to at least one of i) a signal power level of the first wireless signals being less than a first signal power threshold, and ii) a signal power level of the second wireless signals being greater than a second signal power threshold.

Embodiments of the method can include one or more of the following features. In some embodiments, the first protocol is a Mobile Wireless Standards (MWS) protocol; and the second protocol is an Industrial, Scientific and Medical (ISM) band protocol. In some embodiments, the first protocol is an Industrial, Scientific and Medical (ISM) band protocol; and the second protocol is a Mobile Wireless Standards (MWS) protocol. Some embodiments comprise changing a receive mode for receiving the second wireless signals responsive to at least one of i) the signal power level of the first wireless signals not being less than the first signal power threshold, and ii) the signal power level of the second wireless signals not being greater than the second signal power threshold. Some embodiments comprise changing at least one of a transmit mode and a signal power level for transmitting the first wireless signals responsive to at least one of i) the signal power level of the first wireless signals not being less than the first signal power threshold, and ii) the signal power level of the second wireless signals not being greater than the second signal power threshold. Some embodiments comprise not transmitting the first wireless signals while receiving the second wireless signals responsive to a priority of the first wireless signals being less than a priority of the second wireless signals and at least one of i) the signal power level of the first wireless signals not being less than the first signal power threshold; and ii) the signal power level of the second wireless signals not being greater than the second signal power threshold.

In general, in one aspect, an embodiment features computer-readable media embodying instructions executable by a computer in an electronic device to perform functions comprising: causing the electronic device to transmit, according to a first protocol, first wireless signals in a first frequency band while the electronic device receives, according to a second protocol, second wireless signals in a second frequency band that is adjacent to or overlaps the first frequency band, responsive to at least one of i) a signal power level of the first wireless signals being less than a first signal power threshold; and ii) a signal power level of the second wireless signals being greater than a second signal power threshold.

Embodiments of the computer-readable media can include one or more of the following features. In some embodiments, the first protocol is a Mobile Wireless Standards (MWS) protocol; and the second protocol is an Industrial, Scientific and Medical (ISM) band protocol. In some embodiments, the first protocol is an Industrial, Scientific and Medical (ISM) band protocol; and the second protocol is a Mobile Wireless Standards (MWS) protocol. In some embodiments, the functions further comprise: changing a receive mode for receiving the second wireless signals responsive to at least one of i) the signal power level of the first wireless signals not being less than the first signal power threshold, and ii) the signal power level of the second wireless signals not being greater than the second signal power threshold. In some embodiments, the functions further comprise: changing at least one of a transmit mode and a signal power level for transmitting the first wireless signals responsive to at least one of i) the signal power level of the first wireless signals not being less than the first signal power threshold, and ii) the signal power level of the second wireless signals not being greater than the second signal power threshold. In some embodiments, the functions further comprise: not transmitting the first wireless signals while receiving the second wireless signals responsive to i) a priority of the first wireless signals being less than a priority of the second wireless signals, and ii) at least one of a) the signal power level of the first wireless signals not being less than the first signal power threshold; and b) the signal power level of the second wireless signals not being greater than the second signal power threshold.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Embodiments of the present disclosure provide coexistence among multiple wireless communication technologies based on the signal power levels of the wireless signals. In some cases, the wireless communication technologies use adjacent frequency bands, and so cause adjacent channel interference. For example, some bands used by Mobile Wireless Standards (MWS) technologies are adjacent to the Industrial, Scientific and Medical (ISM) frequency band. In other cases, the interference results from wireless communication technologies using frequency bands that partially or fully overlap. For example, both WiFi and Bluetooth use the ISM frequency band.

Figure 1:
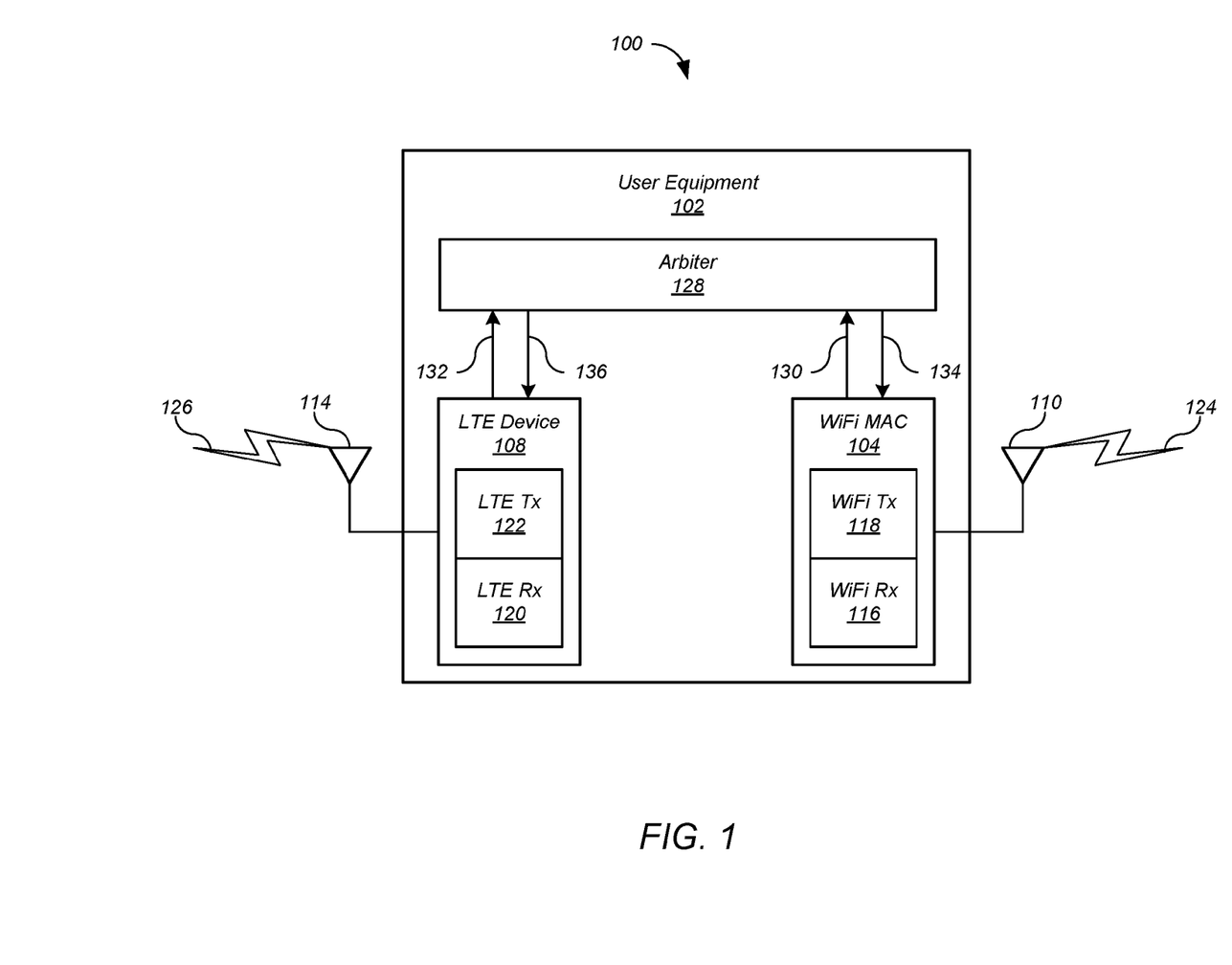
FIG. 1 shows elements of a communication system according to one embodiment.

FIG. 1 shows elements of a communication system 100 according to one embodiment. Although in the described embodiments the elements of the communication system 100 are presented in one arrangement, other embodiments may feature other arrangements. For example, elements of the communication system 100 can be implemented in hardware, software, or combinations thereof.

Referring to FIG. 1, the communication system 100 includes a user equipment (UE) 102 capable of communications using multiple wireless technologies. The user equipment 102 can be implemented as any sort of electronic device capable of performing the functions described herein. For example, the user equipment 102 can be implemented as a smartphone, tablet computer, or the like. Elements of user equipment 102 can be implemented as one or more integrated circuits.

The user equipment 102 includes multiple transceivers employing different wireless technologies. In the example of FIG. 1, the transceivers include a Mobile Wireless Standards (MWS) transceiver and an Industrial, Scientific and Medical (ISM) band transceiver. In other embodiments, other numbers of transceivers and other combinations of wireless technologies can be employed instead. For example, the MWS transceivers can include Long Term Evolution (LTE) transceivers, Worldwide Interoperability for Microwave Access (WiMAX) transceivers, and the like, and the ISM band transceivers can include WiFi transceivers, Bluetooth transceivers, ZigBee transceivers, and the like. The transceivers can include two MWS transceivers or two ISM transceivers. The ISM band equipment can also include receive-only devices such as global positioning system (GPS) receivers, frequency modulation (FM) radio receivers, and the like.

In the example of FIG. 1, the transceivers include a WiFi media access controller (MAC) 104 and an LTE device 108. Each transceiver communicates using one or more respective antennas. In particular, the WiFi MAC 104 uses one or more antennas 110, and the LTE device 108 uses one or more antennas 114. In some embodiments, one or more of the antennas 110, 114 can be combined.

The WiFi MAC 104 includes a receiver (WiFi Rx) 116 and a transmitter (WiFi Tx) 118. The LTE device 108 includes a receiver (LTE Rx) 120 and a transmitter (LTE Tx) 122. The WiFi MAC 104 uses antenna 110 to transmit and receive wireless WiFi protocol signals 124 (also referred to herein as WiFi signals 124). The LTE device 108 uses antenna 114 to transmit and receive wireless LTE protocol signals 126 (also referred to herein as LTE signals 126).

The user equipment 102 also includes an arbiter 128. The arbiter 128 can be implemented as a processor. Processors according to various embodiments can be fabricated as one or more integrated circuits. The arbiter 128 receives information signals 130, 132 from the transceivers 104, 108, and provides control signals 134, 136 to the transceivers 104, 108. The arbiter 128 receives the information signals 130 from the WiFi MAC 104, and provides the control signals 134 to the WiFi MAC 104. The arbiter 128 receives the information signals 132 from the LTE device 108, and provides the control signals 136 to the LTE device 108.

The information signals 130, 132 include indications of the signal power levels of the wireless signals 124, 126. In some embodiments, the information signals 130, 132 include indications of other factors such as the priorities of the traffic carried by the wireless signals 124, 126, and the like. The indications of the signal power levels of the wireless signals 124, 126 can include the signal power levels of the wireless signals 124, 126 received by the receivers 116, 120, the signal power levels of the wireless signals 124, 126 employed by the transmitters 118, 122 to transmit the wireless signals 124, 126, and the like. The signal power levels can include present signal power levels, as well as planned future signal power levels. The signal power level of a wireless signal 124, 126 to be received by a receiver 116, 120 can be estimated based on system parameters, a history of received signal power levels, and the like. The history of received signal power levels can include an average of previous signal power levels, the latest instantaneous received signal power level, and the like. The signal power level of a wireless signal 124, 126 to be transmitted by a transmitter 118, 122 can be known in advance when controlled by a network, selected in advance by the transmitter 118, 122, and the like.

The arbiter 128 employs the control signals 134, 136 to control the operation of the transceivers 104, 108. Arbiter 128 can employ the control signals 134, 136 to control the signal power levels employed by the transmitters 118, 122, the timing of the transmission of the transmitters 118, 122, the transmission modes employed by the transmitters 118, 122, the reception modes employed by the receivers 116, 120, and the like.

Figure 2:
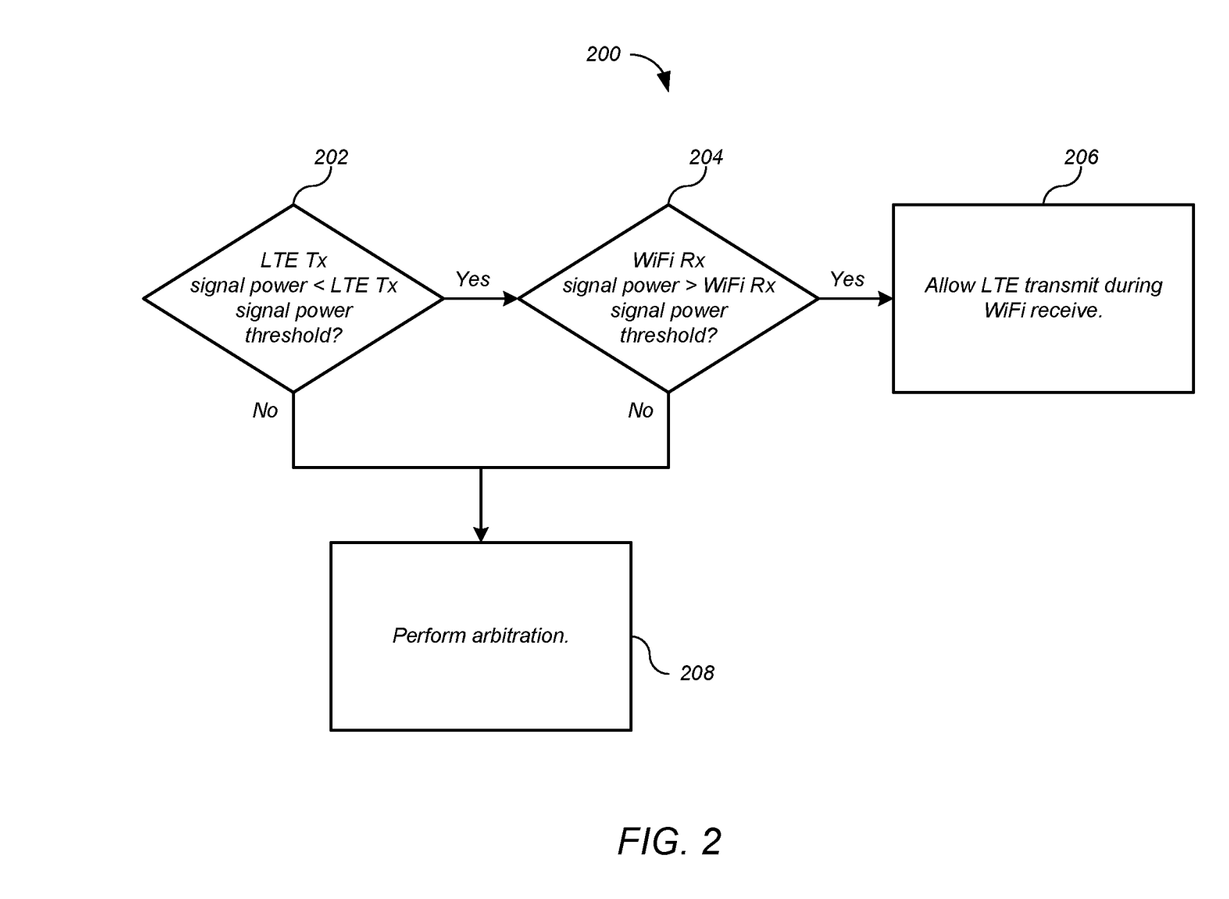
FIG. 2 shows a process for the communication system of FIG. 1 according to an embodiment that considers the signal power levels of LTE transmission and WiFi reception.

FIG. 2 shows a process 200 for the communication system 100 of FIG. 1 according to an embodiment that considers the signal power levels of LTE transmission and WiFi reception. Although in the described embodiments the elements of the process 200 are presented in one arrangement, other embodiments may feature other arrangements. For example, in various embodiments, some or all of the elements of the process 200 can be executed in a different order, concurrently, and the like. Also some elements of the process 200 may not be performed, and may not be executed immediately after each other.

Referring to FIG. 2, at 202, the arbiter 128 determines whether the signal power level of the LTE signals 126 transmitted by the LTE transmitter 122 is less than a predetermined LTE Tx signal power threshold. If yes at 202, then at 204, the arbiter 128 determines whether the signal power level of the WiFi signals 124 received by the WiFi receiver 116 is greater than a predetermined WiFi Rx signal power threshold. If yes at 204, then at 206, the arbiter 128 allows the LTE transmitter 122 to transmit the LTE signals 126 while the WiFi receiver 116 receives the WiFi signals 124.

If no at 202 or 204, then at 208, the arbiter 128 performs arbitration. In some cases, the arbitration involves stopping the transmission of the LTE signals 126 by the LTE transmitter 122. In other embodiments, the arbitration involves other techniques.

In some embodiments, arbitration involves a comparison of the priorities of the LTE signals 126 transmitted by the LTE transmitter 122 and the WiFi signals 124 received by the WiFi receiver 116. For example, if the priority of the traffic carried by the WiFi signals 124 is greater than the priority of the traffic carried by the LTE signals 126, then the arbiter 128 stops the transmission of the LTE signals 126 by the LTE transmitter 122. Conversely, if the priority of the traffic carried by the WiFi signals 124 is less than the priority of the traffic carried by the LTE signals 126, then the arbiter 128 stops the reception of the WiFi signals 124 by the WiFi receiver 116.

In some embodiments, instead of stopping the transmission of the LTE signals 126 by the LTE transmitter 122 or stopping the reception of the WiFi signals 124 by the WiFi receiver 116, the arbiter 128 reduces the signal power level of the LTE signals 126 transmitted by the LTE transmitter 122, or changes the transmit mode of the LTE transmitter 122, or both. The transmit modes can include modulation and coding schemes (MCS), multiple-input and multiple-output (MIMO) ranks, and the like. In some embodiments, the transmit mode selection is based on the signal power level of the LTE signals 126 transmitted by the LTE transmitter 122. For example, the arbiter can reduce the signal power level and MCS of the LTE signals 126 transmitted by the LTE transmitter 122 such that the resulting signal power level is less than the predetermined LTE Tx signal power threshold.

In some embodiments, the arbiter 128 changes the receive mode of the WiFi receiver 116 instead of, or in addition to, the above actions. For example, if the scheduled WiFi receive MCS is 16QAM (quadrature amplitude modulation), the arbiter 128 can reduce the WiFi receive MCS to QPSK (quadrature phase-shift keying).

Figure 3:
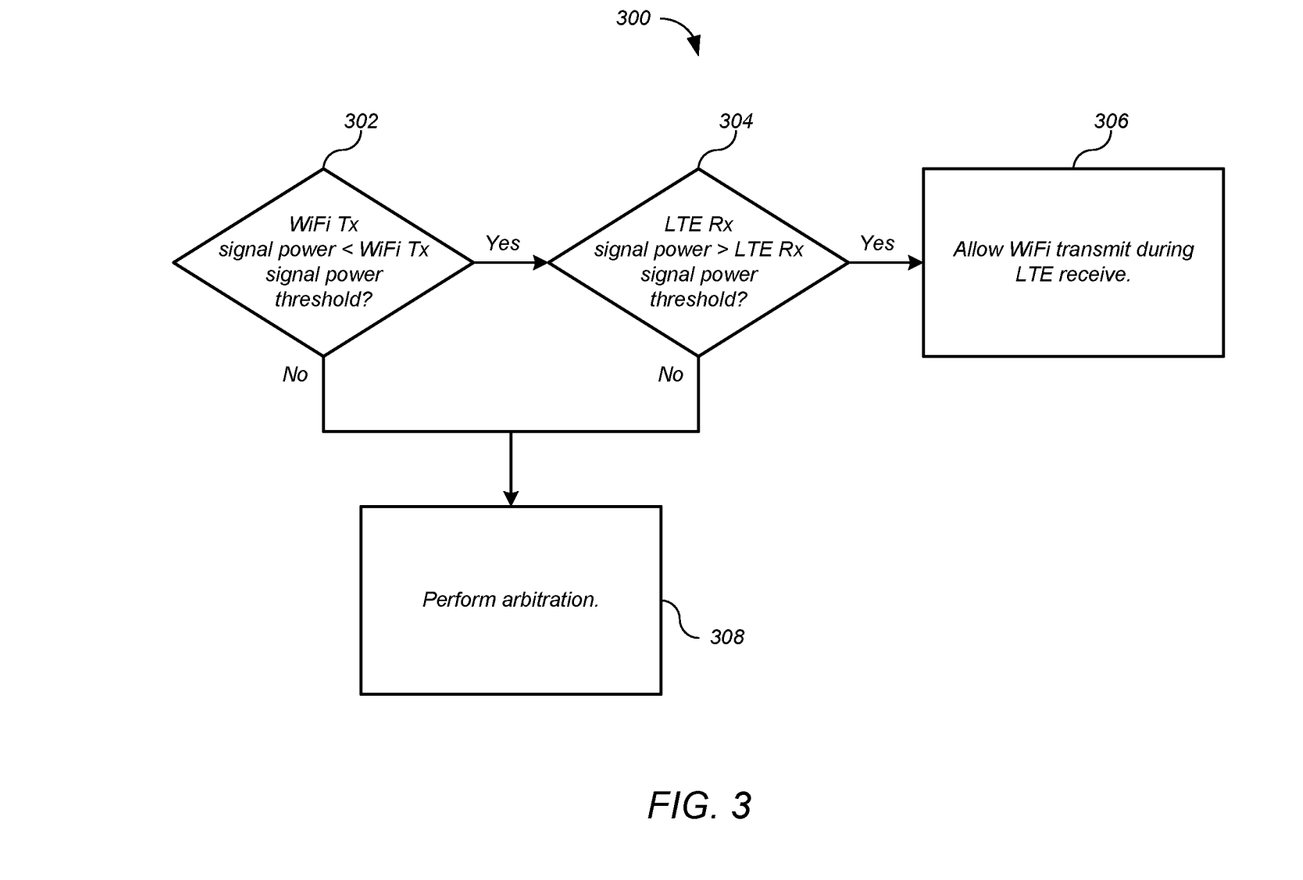
FIG. 3 shows a process for the communication system of FIG. 1 according to an embodiment that considers the signal power levels of WiFi transmission and LTE reception.

FIG. 3 shows a process 300 for the communication system 100 of FIG. 1 according to an embodiment that considers the signal power levels of WiFi transmission and LTE reception. Although in the described embodiments the elements of the process 300 are presented in one arrangement, other embodiments may feature other arrangements. For example, in various embodiments, some or all of the elements of the process 300 can be executed in a different order, concurrently, and the like. Also some elements of the process 300 may not be performed, and may not be executed immediately after each other.

Referring to FIG. 3, at 302, the arbiter 128 determines whether the signal power level of the WiFi signals 124 transmitted by the WiFi transmitter 118 is less than a predetermined WiFi Tx signal power threshold. If yes at 302, then at 304, the arbiter 128 determines whether the signal power level of the LTE signals 126 received by the LTE receiver 120 is greater than a predetermined LTE Rx signal power threshold. If yes at 304, then at 306, the arbiter 128 allows the WiFi transmitter 118 to transmit the WiFi signals 124 while the LTE receiver 120 receives the LTE signals 126.

If no at 302 or 304, then at 308, the arbiter 128 performs arbitration. In some cases, the arbitration involves stopping the transmission of the WiFi signals 124 by the WiFi transmitter 118. In other embodiments, the arbitration involves other techniques.

In some embodiments, arbitration involves a comparison of the priorities of the WiFi signals 124 transmitted by the WiFi transmitter 118 and the LTE signals 126 received by the LTE receiver 120. For example, if the priority of the traffic carried by the LTE signals 126 is greater than the priority of the traffic carried by WiFi signals 124, then arbiter 128 stops the transmission of the WiFi signals 124 by the WiFi transmitter 118. Conversely, if the priority of the traffic carried by LTE signals 126 is less than the priority of the traffic carried by WiFi signals 124, then the arbiter 128 stops the reception of the LTE signals 126 by the LTE receiver 120.

In some embodiments, instead of stopping the transmission of the WiFi signals 124 by the WiFi transmitter 118 or stopping the reception of the LTE signals 126 by the LTE receiver 120, the arbiter 128 reduces the signal power level of the WiFi signals 124 transmitted by the WiFi transmitter 118, or changes the transmit mode of the WiFi transmitter 118, or both. The transmit modes can include MCS, MIMO ranks, and the like. In some embodiments, the transmit mode selection is based on the signal power level of the WiFi signals 124 transmitted by the WiFi transmitter 118. For example, the arbiter can reduce the signal power level and MCS of the WiFi signals 124 transmitted by the WiFi transmitter 118 such that the resulting signal power level is less than the predetermined WiFi Tx signal power threshold. In some embodiments, the arbiter 128 changes the receive mode of the LTE receiver 120, either instead of, or in addition to, the above actions.

Figure 4:
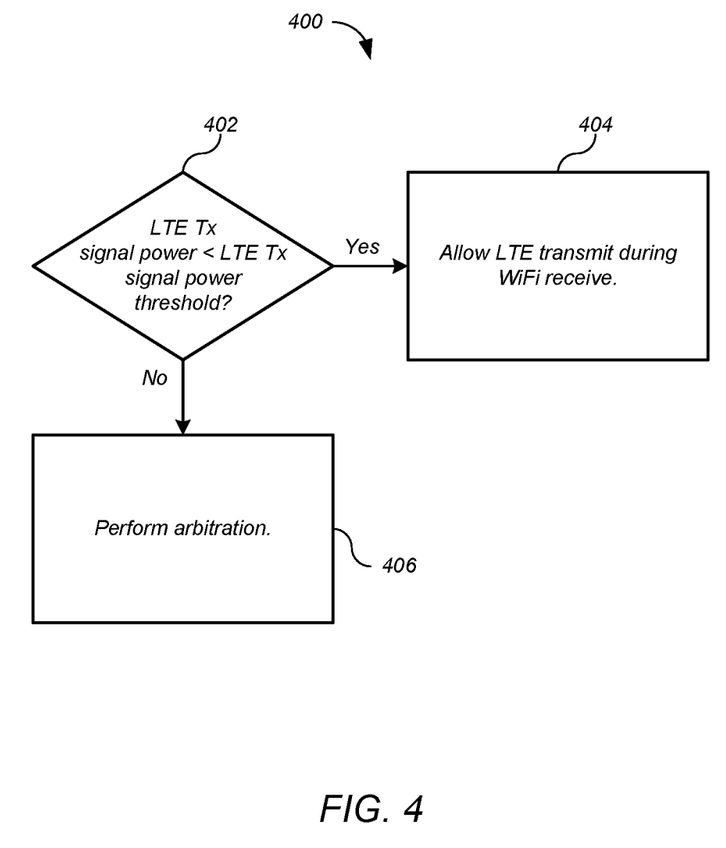
FIG. 4 shows a process for the communication system of FIG. 1 according to an embodiment that considers the signal power level of LTE transmission, but not the signal power level of WiFi reception.

FIG. 4 shows a process 400 for the communication system 100 of FIG. 1 according to an embodiment that considers the signal power level of LTE transmission, but not the signal power level of WiFi reception. Although in the described embodiments the elements of the process 400 are presented in one arrangement, other embodiments may feature other arrangements. For example, in various embodiments, some or all of the elements of the process 400 can be executed in a different order, concurrently, and the like. Also some elements of the process 400 may not be performed, and may not be executed immediately after each other.

Referring to FIG. 4, at 402, the arbiter 128 determines whether the signal power level of the LTE signals 126 transmitted by the LTE transmitter 122 is less than a predetermined LTE Tx signal power threshold. If yes at 402, then at 404, the arbiter 128 allows the LTE transmitter 122 to transmit the LTE signals 126 while the WiFi receiver 116 receives the WiFi signals 124. If no at 402, then at 406, the arbiter 128 performs arbitration, for example as described above with reference to FIG. 2.

Figure 5:
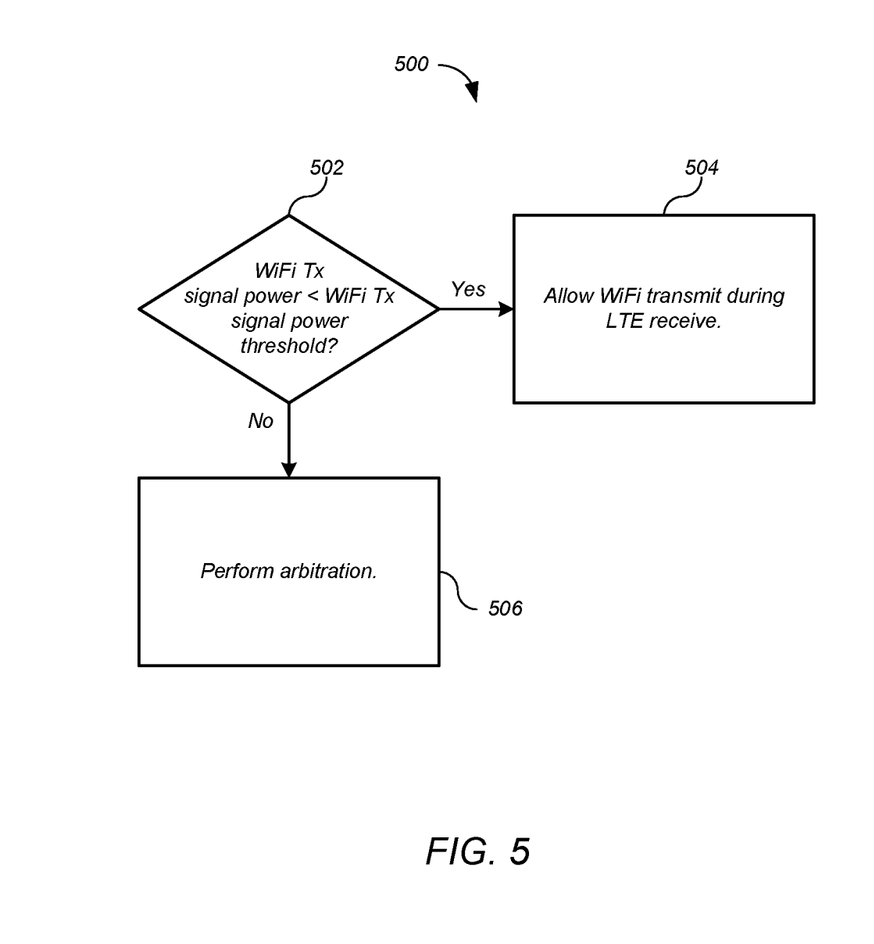
FIG. 5 shows a process for the communication system of FIG. 1 according to an embodiment that considers the signal power level of WiFi transmission, but not the signal power level of LTE reception.

FIG. 5 shows a process 500 for the communication system 100 of FIG. 1 according to an embodiment that considers the signal power level of WiFi transmission, but not the signal power level of LTE reception. Although in the described embodiments the elements of the process 500 are presented in one arrangement, other embodiments may feature other arrangements. For example, in various embodiments, some or all of the elements of the process 500 can be executed in a different order, concurrently, and the like. Also some elements of the process 500 may not be performed, and may not be executed immediately after each other.

Referring to FIG. 5, at 502, the arbiter 128 determines whether the signal power level of the WiFi signals 124 transmitted by the WiFi transmitter 118 is less than a predetermined WiFi Tx signal power threshold. If yes at 502, then at 504, the arbiter 128 allows the WiFi transmitter 118 to transmit the WiFi signals 124 while the LTE receiver 120 receives the LTE signals 126. If no at 502, then at 506, the arbiter 128 performs arbitration, for example as described above with reference to FIG. 3.

Figure 6:
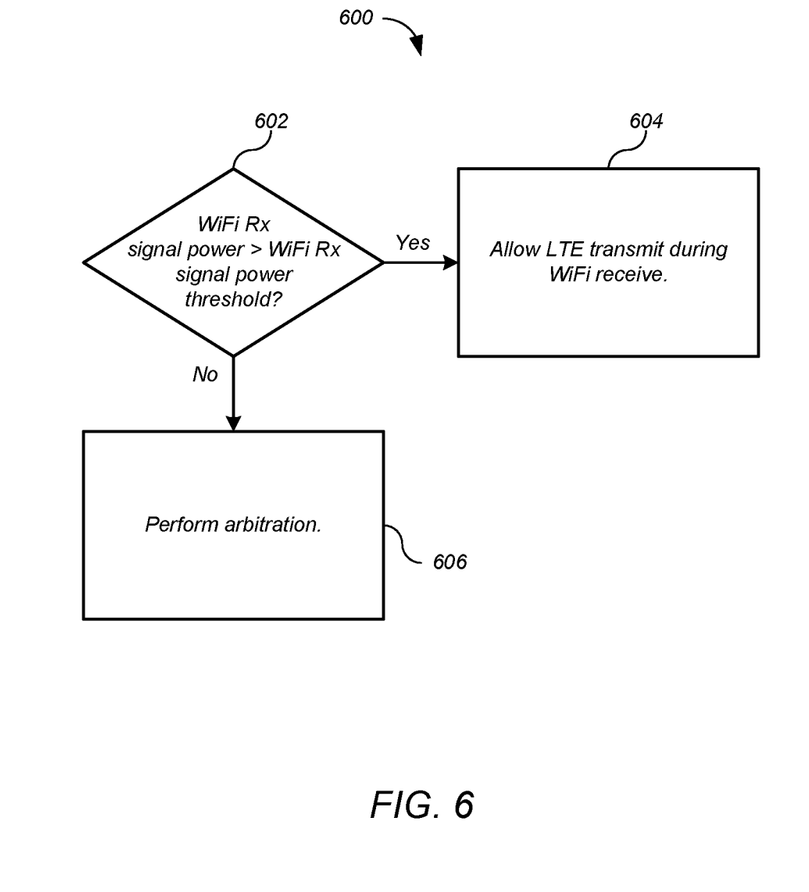
FIG. 6 shows a process for the communication system of FIG. 1 according to an embodiment that considers the signal power level of WiFi reception, but not the signal power level of LTE transmission.

FIG. 6 shows a process 600 for the communication system 100 of FIG. 1 according to an embodiment that considers the signal power level of WiFi reception, but not the signal power level of LTE transmission. Although in the described embodiments the elements of the process 600 are presented in one arrangement, other embodiments may feature other arrangements. For example, in various embodiments, some or all of the elements of the process 600 can be executed in a different order, concurrently, and the like. Also some elements of the process 600 may not be performed, and may not be executed immediately after each other.

Referring to FIG. 6, at 602, the arbiter 128 determines whether the signal power level of the WiFi signals 124 received by the WiFi receiver 116 is greater than a predetermined WiFi Rx signal power threshold. If yes at 602, then at 604, the arbiter 128 allows the LTE transmitter 122 to transmit the LTE signals 126 while the WiFi receiver 116 receives the WiFi signals 124. If no at 602, then at 606, the arbiter 128 performs arbitration, for example as described above with reference to FIG. 2.

Figure 7:
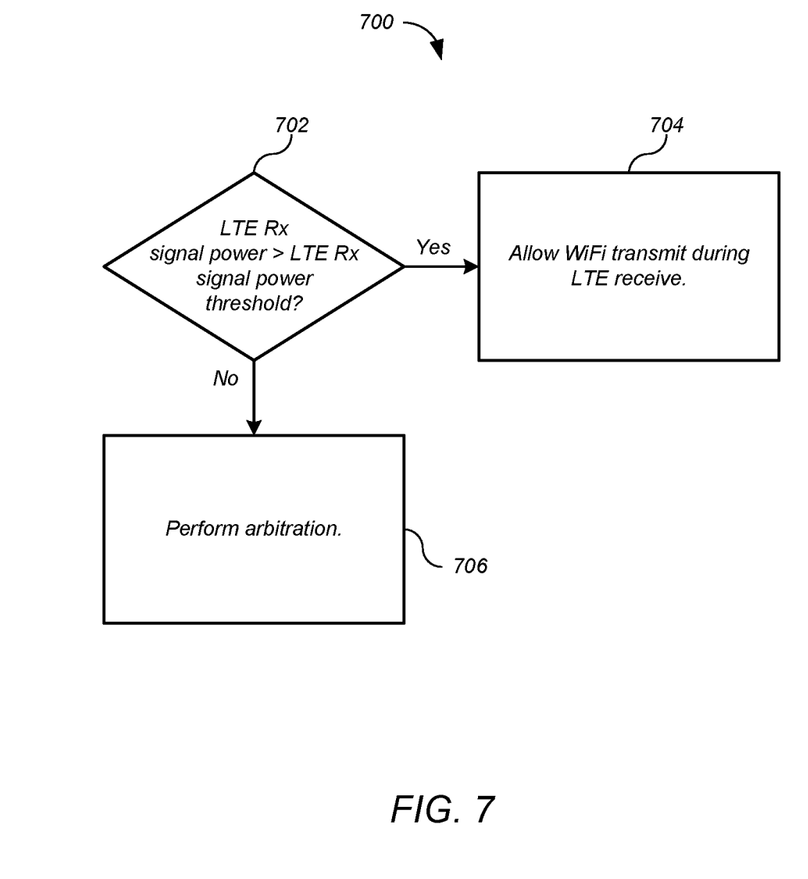
FIG. 7 shows a process for the communication system of FIG. 1 according to an embodiment that considers the signal power level of LTE reception, but not the signal power level of WiFi transmission.

FIG. 7 shows a process 700 for the communication system 100 of FIG. 1 according to an embodiment that considers the signal power level of LTE reception, but not the signal power level of WiFi transmission. Although in the described embodiments the elements of the process 700 are presented in one arrangement, other embodiments may feature other arrangements. For example, in various embodiments, some or all of the elements of the process 700 can be executed in a different order, concurrently, and the like. Also some elements of the process 700 may not be performed, and may not be executed immediately after each other.

Referring to FIG. 7, at 702, the arbiter 128 determines whether the signal power level of the LTE signals 126 received by the LTE receiver 120 is greater than a predetermined LTE Rx signal power threshold. If yes at 702, then at 704, the arbiter 128 allows the WiFi transmitter 118 to transmit the WiFi signals 124 while the LTE receiver 120 receives the LTE signals 126. If no at 702, then at 706, the arbiter 128 performs arbitration, for example as described above with reference to FIG. 3.

In various embodiments, various measures of received signal power levels can be employed. If noise and interference are not addressed, then RSRP (reference signal received power for LTE) or RSSI (received signal strength indicator) can be employed. If noise and interference are also addressed, then SNR (signal-to-noise ratio), SIR (signal-to-interference ratio), SINR (signal-to-interference-and-noise ratio), or RSRQ (reference signal received quality for LTE) can be employed. Where user equipment 102 includes a MWS transceiver and multiple ISM transceivers are employed, the ISM transmit and receive signal power levels are those of either ISM transceiver, or both at the same time.

The signal power thresholds discussed herein, namely the LTE Tx signal power threshold, the LTE Rx signal power threshold, the WiFi Tx signal power threshold, and the WiFi Rx signal power threshold, are programmable values, and are stored in the arbiter 128. The signal power thresholds can be selected according to various factors such as antenna isolation and band separation between LTE and ISM, ISM and LTE receiver performance and capability, and the like. In some embodiments, the signal power thresholds for one transceiver can be dynamic values, for example as a function of the signal power level of the other transceiver.

For example, assume that the saturation point of the LTE receiver 120 is −25 dBm, the antenna isolation between the WiFi antenna 110 and the LTE antenna 114 is 12 dB, the RF filter attenuation between the WiFi transmitter 118 and the LTE receiver is 20 dB, the attenuation due to band separation between WiFi transmitter 118 and the LTE receiver 120 is 10 dB, and the minimum SIR required for the LTE receiver 120 is 0 dB. Then the WiFi Tx threshold can be set at −25+12+20+10=17 dBm, and the LTE Rx threshold can be set at the WiFi transmit signal power level−12−20−10+0=the WiFi transmit signal power level−42 dBm. Therefore, if the WiFi transmit signal power level<17 dBm, and if the LTE receive signal power level>WiFi Tx power level−42 dBm, the arbiter 128 allows WiFi transmission and LTE reception at the same time.

Various embodiments feature one or more of the following advantages. From the viewpoint of an MWS base station, the downlink resource is saved from engaging in unsuccessful transactions resulting from potentially high interference with ISM transmissions from the user equipment 102. Thus the downlink resource can be used for other user equipment 102 resulting in better resource utilization efficiency for the base station. From the viewpoint of ISM devices in user equipment 102, the ISM receive resource is saved from unsuccessful receive transactions resulting from potentially high interference with MWS uplink packets. Note these advantages are achieved without changing existing 3GPP LTE standards.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, various modifications may be made without departing from the scope of the disclosure. Accordingly, other implementations are within the scope of the following claims.

What is claimed is:

1. A device comprising:
a transmitter to transmit a first signal, wherein the first signal has a fundamental frequency in a first frequency band of a first wireless protocol;
a receiver to receive a second signal, wherein the second signal has a fundamental frequency in a second frequency band of a second wireless protocol, wherein the first frequency band is adjacent to or at least partially overlaps the second frequency band; and
an arbiter to allow the transmitter to transmit the first signal in the first frequency band while the receiver receives the second signal in the second frequency band, wherein the arbiter is further to, if a power level of the first signal is less than a first threshold, change at least one of (i) a modulation and coding scheme of the transmitter for the first signal, (ii) a modulation and coding scheme of the receiver for the second signal, or (iii) a multiple input and multiple output rank.

2. The device of claim 1, wherein the arbiter is further to, if a power level of the second signal is greater than a second threshold, change at least one of (i) the modulation and coding scheme of the transmitter for the first signal, (ii) the modulation and coding scheme of the receiver for the second signal, or (iii) the multiple input and multiple output rank.

3. The device of claim 2, wherein the arbiter is further to change a receive mode including changing the modulation and coding scheme of the receiver if the power level of the first signal is less than the first threshold.

4. The device of claim 2, wherein the arbiter is further to, if the power level of the first signal is less than the first threshold, change a transmit mode including changing at least one of the modulation and coding scheme of the transmitter or the multiple input and multiple output rank.

5. The device of claim 1, wherein the arbiter is further to change a receive mode including changing the modulation and coding scheme of the receiver if the power level of the first signal is less than the first threshold.

6. The device of claim 1, wherein the arbiter is further to, if the power level of the first signal is less than the first threshold, change a transmit mode including changing the modulation and coding scheme of the transmitter or the multiple input and multiple output rank.

7. The device of claim 1, wherein the arbiter is further to change the multiple input and multiple output rank if the power level of the first signal is less than the first threshold.

8. The device of claim 1, wherein the arbiter is further to, if the power level of the first signal is less than the first threshold, change the modulation and coding scheme of the transmitter and the multiple input and multiple output rank.

9. A device comprising:
a transmitter to transmit a first signal, wherein the first signal has a fundamental frequency in a first frequency band of a first wireless protocol;
a receiver to receive a second signal, wherein the second signal has a fundamental frequency in a second frequency band of a second wireless protocol, wherein the first frequency band is adjacent to or at least partially overlaps the second frequency band; and an arbiter to allow the transmitter to transmit the first signal in the first frequency band while the receiver receives the second signal in the second frequency band, wherein the arbiter is further to, if a power level of the second signal is greater than a first threshold, change at least one of (i) a modulation and coding scheme of the transmitter for the first signal, (ii) a modulation and coding scheme of the receiver for the second signal, or (iii) a multiple input and multiple output rank.

10. The device of claim 9, wherein the arbiter is further to, if a power level of the first signal is less than a second threshold, change at least one of (i) a modulation and coding scheme of the transmitter for the first signal, (ii) a modulation and coding scheme of the receiver for the second signal, or (iii) a multiple input and multiple output rank.

11. The device of claim 10, wherein the arbiter is further to change a receive mode including changing the modulation and coding scheme of the receiver if the power level of the second signal is greater than the first threshold.

12. The device of claim 10, wherein the arbiter is further to, if the power level of the second signal is greater than the first threshold, change a transmit mode including changing at least one of the modulation and coding scheme of the transmitter or the multiple input and multiple output rank.

13. The device of claim 9, wherein the arbiter is further to change a receive mode including changing the modulation and coding scheme of the receiver if the power level of the second signal is greater than the first threshold.

14. The device of claim 9, wherein the arbiter is further to, if the power level of the second signal is greater than the first threshold, change a transmit mode including changing the modulation and coding scheme of the transmitter or the multiple input and multiple output rank.

15. The device of claim 9, wherein the arbiter is further to change the multiple input and multiple output rank if the power level of the second signal is greater than the first threshold.

16. The device of claim 9, wherein the arbiter is further to, if the power level of the second signal is greater than the first threshold, change the modulation and coding scheme and the multiple input and multiple output rank.

17. A device comprising:
a transmitter to transmit a first signal, wherein the first signal has a fundamental frequency in a first frequency band of a first wireless protocol;
a receiver to receive a second signal, wherein the second signal has a fundamental frequency in a second frequency band of a second wireless protocol, wherein the first frequency band is adjacent to or at least partially overlaps the second frequency band; and
an arbiter to, if at least one of a first power level of the first signal is less than a first threshold or a second power level of the second signal is greater than a second threshold, allow the transmitter to transmit the first signal in the first frequency band while the receiver receives the second signal in the second frequency band.

18. The device of claim 17, wherein the arbiter is to, if the first power level of the first signal is less than the first threshold, allow the transmitter to transmit the first signal in the first frequency band while the receiver receives the second signal in the second frequency band.

19. The device of claim 17, wherein the arbiter is to, if the second power level of the second signal is greater than the second threshold, allow the transmitter to transmit the first signal in the first frequency band while the receiver receives the second signal in the second frequency band.

20. The device of claim 17, wherein the arbiter is to, if the first power level of the first signal is less than the first threshold and the second power level of the second signal is greater than the second threshold, allow the transmitter to transmit the first signal in the first frequency band while the receiver receives the second signal in the second frequency band.

* * * * *